(12) United States Patent
Tokunaga et al.

(10) Patent No.: US 7,544,268 B2
(45) Date of Patent: Jun. 9, 2009

(54) STATIC ELECTRICITY PREVENTING METHOD AND MEMBER USING THE METHOD

(75) Inventors: Hisatsugu Tokunaga, Isezaki (JP); Atsushi Takei, Isezaki (JP); Mikio Shimizu, Isezaki (JP); Takeshi Nabeta, Isezaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 306 days.

(21) Appl. No.: 10/502,808

(22) PCT Filed: Feb. 18, 2003

(86) PCT No.: PCT/JP03/01713

§ 371 (c)(1), (2), (4) Date: Aug. 6, 2004

(87) PCT Pub. No.: WO03/070812

PCT Pub. Date: Aug. 28, 2003

(65) Prior Publication Data

US 2005/0106371 A1 May 19, 2005

(30) Foreign Application Priority Data

Feb. 20, 2002 (JP) .............................. 2002-042908

(51) Int. Cl.
*C09J 5/04* (2006.01)
*B05D 3/12* (2006.01)
*B32B 7/02* (2006.01)

(52) U.S. Cl. ....................... 156/315; 156/60; 156/273.1; 156/297; 156/299; 156/307.1; 427/286; 427/467; 428/195.1; 428/212; 428/213; 428/214; 428/215; 428/216; 428/217; 428/218; 428/219; 428/220; 383/105; 383/109; 383/116

(58) Field of Classification Search ................... 156/60, 156/273.1, 297, 299, 307.1, 315; 427/286, 427/467; 428/195.1, 212, 213, 214, 215, 428/216, 217, 218, 219, 220; 383/105, 109, 383/116

See application file for complete search history.

(56) References Cited

U.S. PATENT DOCUMENTS

| | | | | |
|---|---|---|---|---|
| 4,622,565 A | * | 11/1986 | Watanabe et al. | ............ 503/201 |
| 4,699,830 A | * | 10/1987 | White | ........................ 428/35.3 |
| 4,795,676 A | * | 1/1989 | Maekawa et al. | ............ 428/328 |
| 4,971,196 A | * | 11/1990 | Kitamura et al. | ............ 206/204 |
| 5,097,949 A | * | 3/1992 | Heldwein | .................... 206/720 |
| 5,110,669 A | * | 5/1992 | Knobel et al. | ................ 428/215 |
| 5,175,033 A | | 12/1992 | Havens | |
| 5,217,767 A | | 6/1993 | Gutman et al. | |
| 5,405,681 A | * | 4/1995 | Nakayama et al. | ........... 428/215 |
| 5,538,577 A | * | 7/1996 | Negoro | ......................... 156/235 |
| 5,731,117 A | * | 3/1998 | Ferrar et al. | ................... 430/66 |
| 5,989,696 A | * | 11/1999 | McCarthy et al. | ............ 428/221 |
| 5,998,014 A | | 12/1999 | Muller et al. | |
| 6,017,610 A | * | 1/2000 | Abe et al. | ................. 428/195.1 |
| 6,495,231 B2 | * | 12/2002 | Benoit et al. | ................... 428/46 |
| 6,730,401 B2 | * | 5/2004 | Jackson et al. | ............ 428/411.1 |
| 6,887,557 B2 | * | 5/2005 | Onozawa et al. | ......... 428/195.1 |
| 6,946,202 B1 | * | 9/2005 | Maruta et al. | ................ 428/480 |

FOREIGN PATENT DOCUMENTS

| | | |
|---|---|---|
| JP | 58-24343 | 2/1983 |
| JP | 63-202893 | 8/1988 |
| JP | 4-33850 | 2/1992 |
| JP | 5-162255 | 6/1993 |
| JP | 7-26043 | 1/1995 |
| JP | 10-137676 | 5/1998 |
| JP | 10-278966 | 10/1998 |
| JP | 11-78311 | 3/1999 |
| JP | 2000-6324 | 1/2000 |
| JP | 2000-155390 | 6/2000 |
| JP | 2000-273406 | 10/2000 |
| JP | 2002-86631 | 3/2002 |
| TW | 26024 | 8/1979 |
| TW | 460533 | 10/2001 |

OTHER PUBLICATIONS

"Triboelectric Series", Silicon Far East, (2001), at http://www.siliconfareast.com/tribo_series.htm.*
Patent Abstracts of Japan, JP 05-162255, Jun. 29, 1993 (reference previously filed in Japanese language on Aug. 6, 2004).
Patent Abstracts of Japan, JP 07-026043, Jan. 27, 1995 (reference previously filed in Japanese language on Aug. 6, 2004).
Patent Abstracts of Japan, JP 10-137676, May 26, 1998 (reference previously filed in Japanese language on Aug. 6, 2004).

* cited by examiner

*Primary Examiner*—Callie E Shosho
*Assistant Examiner*—David J Joy
(74) *Attorney, Agent, or Firm*—Oblon, Spivak, McClelland, Maier & Neustadt, P.C.

(57) ABSTRACT

The present invention provides a new antistatic method and its application to members. The present invention is an antistatic method featured to mount multiple resin based composites with different triboelectric series order on the surface and members featured to have multiple resin based composites with different triboelectric series order on the surface. The members are resin based sheets, resin based films or resin molded materials. The resin based composites are adhesives, bonding agents, printing ink or paint.

5 Claims, 2 Drawing Sheets

STATIC ELECTRICITY PREVENTING METHOD AND MEMBER USING THE METHOD

TECHNICAL FIELD

The present invention relates to an antistatic method and its application to members.

BACKGROUND ART

It is demanded to reduce the generation of static electricity in various fields and applications such as packaging containers for electronic components and surface protection films stuck on polarizing plates for liquid-crystal display panels. The packaging container for electronic components is, for example, an embossed carrier type taping with which the electronic components are housed in the embossed part of the carrier tape and sealed by thermal fusion so as to cover the embossed part by the cover tape. The packaging containers include also magazines, trays and bags. Static electricity is generated by the contact of electronic components and packaging containers. Static electricity has a risk of deterioration and destruction for electronic components. Contacting the packaging containers at each other or contacting the packaging container with other materials generate static electricity and might lead to deterioration or destruction of the electronic components through the packaging container. Conductivity or antistatic property has been added to the packaging containers for the prevention. This prevention method is effective for discharge or attenuation of the generated static electricity in an early stage. However, it is difficult to reduce the generation of static electricity itself.

A surface protection film has been stuck on a liquid-crystal display panel in the manufacturing process. Static electricity is generated in exfoliating the surface protection film from the surface of liquid-crystal display panel. Some problems caused by static electricity include induction of the poor appearance occurred by sticking dust to the panel surface, occurrence of abnormal displaying, malfunction of the display unit or induction of electrostatic destruction of the drive elements.

JP-8-245932, JP-9-267449 and JP-11-256115 have been proposed as a method using the antistatic treated resin films treated on at least one side of the resin films by antistatic agents such as alkali metal ion, quaternary ammonium salts and metal oxides as member layers constituting the adhesive tape. JP-6-83267 has been disclosed as a method that kneads conductive agents into adhesive layer itself. These both methods do not suppress the generating static electricity, but prevent electrostatic fault by early discharge and attenuation of the generated static electricity.

DISCLOSURE OF THE INVENTION

The inventors have noticed that it is important to suppress the generation of static electricity itself in order to prevent electrostatic failures and obtained the following knowledge. The generation of static electricity may be prevented by mounting multiple resin based composites with different triboelectric series order on the surface. The member mounted multiple resin based composites with multiple different triboelectric series order on the surface may suppress the generation of static electricity even when electronic components and the like are handled on the mounted surface and may prevent the electrostatic failures of electronic components.

Thus, the present invention presents the following points:
1. an antistatic method featured to mount multiple resin based composites with different triboelectric series order on the surface,
2. the antistatic method according to 1, wherein multiple resin based composites with different triboelectric series order comprise resins electrified more positively and more negatively than the electrification-controlled object,
3. the antistatic method according to 1 or 2, wherein multiple resin based composites differ more than 0.1 nC in the amounts of electrified charge,
4. the antistatic method according to 1, 2, or 3, wherein multiple resin based composites are adhesives, bonding agents, printing ink or paints,
5. the antistatic method according to 1 to 4, wherein members are resin based sheets, resin based films or resin molded materials,
6. members featured to have layers of multiple resin based composites with different triboelectric series order on the surface,
7. the members according to 6, wherein the thickness of the layer of resin based composites is 0.1 to 10,000 μm,
8. the members according to 6 or 7, wherein members are resin based sheets, resin based films or resin molded materials.

BEST MODE FOR CARRYING OUT THE INVENTION

Figure 1:
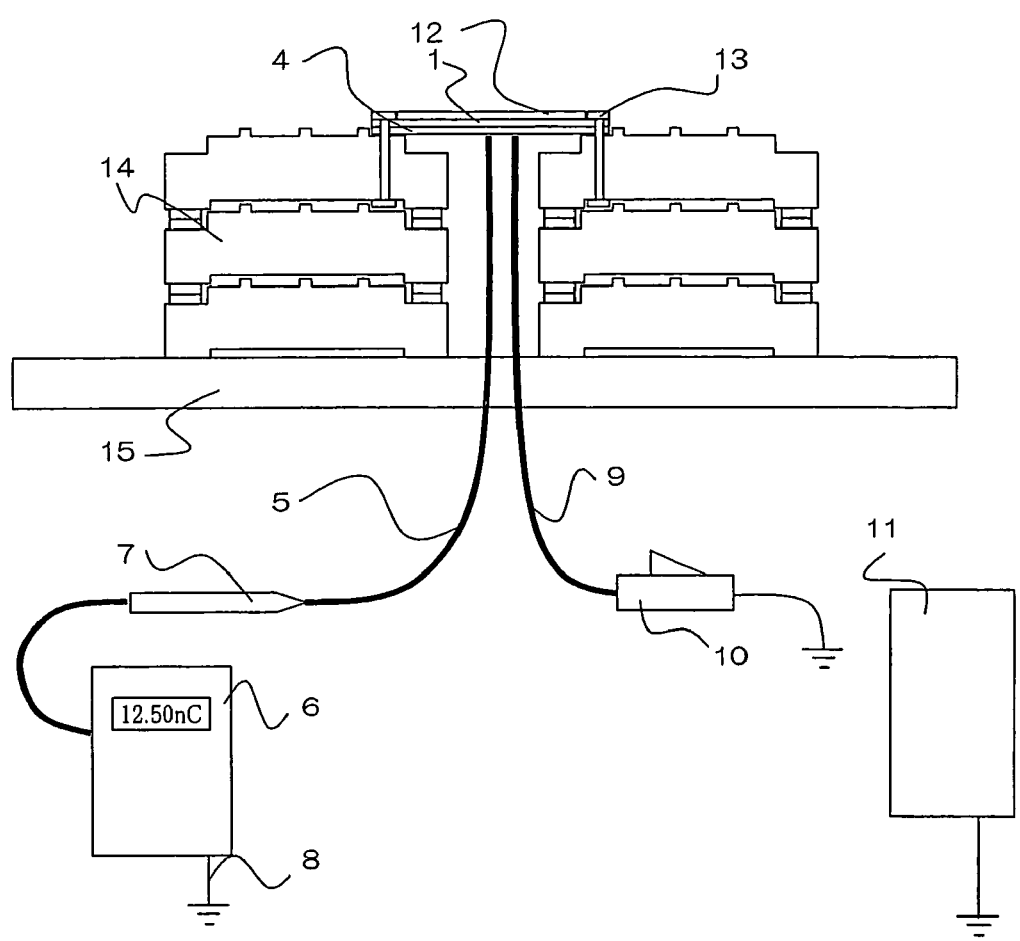
FIG. 1 is a schematic view of an instrument for measuring the amount of peeling electrification. Meanings of each code are as follows: 1, deposited subject, 2, measuring instrument, 3, observation window, 4, metal plate, 5, conducting wire, 6, coulomb meter, 7, measuring probe, 8, conducting wire, 9, conducting wire, 10, switch, 11, antistatic plate, 12, samples, 13, clamp, 14, insulator, and 15, metallic measuring desk.
Figure 2:
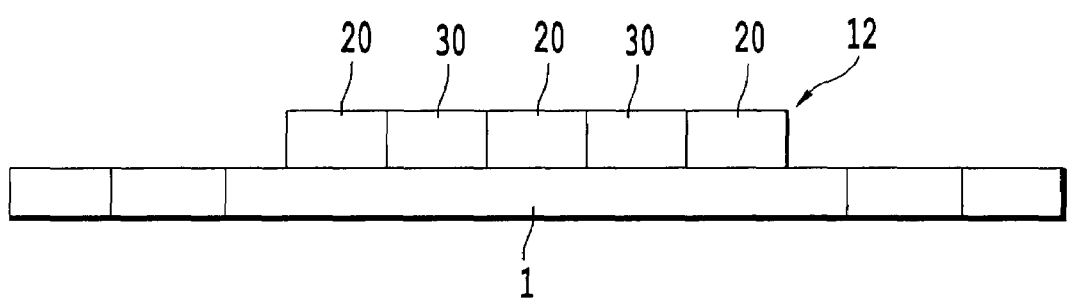
FIG. 2 is a schematic view of an object 1 on which is mounted a sample (adhesive tape) 12 containing first resin based layers 20 and second resin based layers 30 arranged side-by-side along a surface of the object 1.

A triboelectric series is a list that enumerate materials in the positive and negative polarity order by the charge generated in rubbing together two materials and is one of the methods for understanding the electrical properties of various materials. The following triboelectric series is known for main resins used as principal ingredient in adhesives and printing ink:
positive side,
silicone resin,
acrylic resin,
urethane resin,
vinyl based resin,
negative side.
The following triboelectric series is known for main resin:
positive side,
polymethyl methacrylate resin,
polystyrene resin,
polyester resin,
polyethylene resin,
polypropylene resin,
polyvinyl chloride resin,
polytetrafluoroethylene resin,
negative side.

The triboelectric series order is not limited to the aforesaid. The triboelectric series order may be easily measure by positive or negative charging in rubbing together two materials.

In the present Invention, resin based composites are ones which contain resins as its main components, such as adhesives, printing ink, coating materials. As the adhesives, various known types of adhesives such as solvent type, emulsion type, hot melt type and reaction type may be used. For the printing ink, commercially available ink used vinyl based resin, polyurethane based resin, polyacryl based resin, polyester based resin, etc. as binder resins may be used.

In the present invention, multiple resin based composites with different triboelectric series order means composites comprised two or more different resins, preferably two or three ones, and also include a single composite comprising multiple resins with different triboelectric series order. These resin based composites may be mounted on the surface of members in a stratified pattern, for example, by coating adhesives on the surface of members comprising sheets or films by means of a screen method, a photogravure method or a mesh method for the adhesives. For the printing ink, the coated films may be obtained on sheets, films and molded products by means of a spraying method, a bar code method, a doctor blade method, a roll coating method, a screen method, a photogravure method, a mesh method, etc. through coating, drying and removal of organic solvent. In the case of the adhesives and the printing ink, the thickness of the layers of resin based composites is not restricted particularly and may be adjusted corresponding to the purposes, however, generally the thickness of 0.1 to 10,000 μm, more preferably 5 to 5,000 μm is selected.

The method for mounting multiple resin based composite with different triboelectric series order on members may form the resin based composites in arbitrary patterns such as stripe, dot and mesh. Without limiting to these patterns, however, the resin based composites may be coated in random shape. For example, multiple resin based composites with different triboelectric series order may be produced also by coating the resin based composites with different triboelectric series on the coated surface in stripe, dot and mesh patters after coating resin based composites wholly on the surface of members. Resin based composites with the difference of 0.1 nC or more, especially the difference of 0.5 nC or more in electrified charge are preferable to using as the resin based composites with different triboelectric series order. For example, resin based composites for measuring are placed on a slope with an angle of 20 degree. By rolling a cylinder made of Teflon and/or quartz on the slope, amounts of electrified charge on the cylinder are measured using the charge measuring instrument; Triboelectric Charge Generation Test System Model 705 of Electro-Tech System Inc. When it is difficult to apply this charge measuring method because of stickiness of the resin based composites or some other reason, the measurement may be carried out by the determination of an amount of electrification (call 'amount of peeling electrification' in the followings) in peeling of the said adhesive tape from the object with the instrument of FIG. 1. When objects to be prevented against electrification are apparent, combined use of resins electrifying more positively and resins electrifying more negatively than the charge of the objects is preferred for the resin based composites with different triboelectric series order in the invention.

Static electricity is generated between adhesion layer of adhesive tape and the pasted object when the adhesive tape is pasted on the object and peeled. The generation of static electricity is suppressed by using adhesives with different resin composition for the adhesion layer because of different triboelectric series. For example, in using acrylic resin for the pasted object and using silicone resin and vinyl resin for the adhesion layer, positive static electricity is generated since the silicone resin is positive against the acrylic resin in triboelectric series, while negative static electricity is generated in case of vinyl based resin. Thus, the generation of static electricity is suppressed by canceling each other. Even when the resin compositions of principal ingredients of two different adhesives are the same, resins may be used also which are altered the triboelectric series order by the difference of compounding ratio of crosslinking agents, additives and auxiliary can be used also.

The members are, for example, sheets, films and molded materials, preferably with the thickness of 0.1 to 10,000 μm. Multiple resin based composites with different triboelectric series order may be produced on the surfaces of these members. The members may have the structure with adhesives or printing ink coatings. Multiple resin based composites with different triboelectric series order may be mounted on the surface of members by the coextrusion of two or more resin based composites. The molded materials may be also obtained by thermal molding of sheets with antistatic performance.

In the present invention, multiple resin based composites with triboelectric series order is desirable to mount on the surface of resin based members to generate easily static electricity. Resins for the members have no restriction, but it is suitable to use resins with which the triboelectric series differ from that of resin based composites mounted on the surface of members. For example, the following may be used for the members: polystyrene, polyolefins, polyesters, polycarbonates, acrylic resin, polyamides, polyurethane, polyvinyl chloride, epoxy resin, phenolic resin, their modified materials and their blend or alloyed products. For these resins, commercially available resins may be used without modification. These resins may be used alone or as a blend of two or more resins and mixing of other additives is also allowed.

Multiple resin based composites with different triboelectric series order are mounted on the surface of sheets or films by means of the measures such as coating and printing. By adhering and transferring the mounted sheets or films to the surface of molded products, multiple resin based composites with different triboelectric series order may be produced on the surface of molded products. The molded products include, for example, the followings: carrier tapes for semiconductor transportation, trays for semiconductor transportation, containers for LCD module transportation, containers for PDP module transportation, containers for circuit board transportation, containers for mounted board transportation, containers for hard disk transportation, trays for hard disk head transportation and the like. Parts used for paper feeding and parts contacted with paper in printers and copying machines are easily charging parts and the method for suppressing the static electricity in the present invention may be used for these parts. The method may be used in order to prevent the adsorption of dust caused by charging. The objects include cabinets for television, CRTs, personal computers, printers, copying machines and the like. Blackened dirt occurred by electrostatic attachment of dust can be prevent by the method. The method may be used in order to prevent the adsorption of dust caused by charging. For example, if the method is applied to the members used for wall surface and ceiling in clean rooms, the sticking of dust and the lowering of cleanness caused by whirling up the adsorbed dust in the air by certain cause can be prevented. For example, if the method is applied to the members used for wall surface and ceiling in hospitals, the members used for wall surface and ceiling in food processing factories and the members used for dustprotector for production line in food factories, the adhesion of dust may be similarly prevented.

In these examples, multiple resin based composites with different triboelectric series order are mounted on the surface of sheets or films by means of the measures such as coating and printing, and multiple resin based composites with different triboelectric series order are produced on the surface of molded products by adhering and transferring the mounted sheets or films to the surface of molded products. Without using this method, multiple resin based composites with different triboelectric series order may be also mounted directly on the surface of molded materials by means of the measures such as painting and printing.

For the sheets and the films, multiple adhesives comprising multiple resin based composites with different triboelectric series order may coated on the surface in the present invention. An example applied this method is the suppression of peeling electrification generated in exfoliating these adhesive sheets and adhesive films. For example, they include dicing tapes, background tapes and various protective films used in order to protect the optical parts in LCD modules. They prevent the part destruction caused by peeling electrification generated in exfoliating the adhesive sheets and the adhesive films. Other application examples of the adhesive sheets and the adhesive films are protective sheets and protective films used to prevent the scratch or dirt of metal plates, decorative plywoods, plastic plates and various products and are curing sheets and curing tapes used to prevent the parts not to be painted in painting external walls of houses or metal products. It may be prevented that these adhesive sheets and adhesive films cling to the hand of the worker or the surrounding members by peeling electrification generated in peeling after their use.

In the present invention, moreover, multiple resin based composites with different triboelectric series order are mounted on the surface of sheets or films by means of the measures such as coating and printing and the mounted sheets or films are adhered or transferred to the surface of molded products. As another case, multiple resin based composites with different triboelectric series order are mounted directly on the surface molded materials by means of the measures such as painting and printing and arbitrary electrification is generated by the mounted resin based composites. An application example of this method is electrostatic adsorption. For example, in its application to air filter, dust in the gas passing in the filter is charged and adsorbed. For example, in its application to notice boards, paper sheets or films to be noticed on the board are stuck by rubbing and charging.

EXAMPLE 1

A sticky solution which was a mixture of 100 weight parts of addition reaction cross-linking type silicone adhesive (manufactured by Dow Corning Toray Silicone Co. Ltd., SD 4580, the amount of electrified charge of +1.5 nC) and 0.9 weight parts of a curing agent (manufactured by Dow Corning Toray Silicone Co. Ltd., NC 25) was coated on one side of polyester film (manufactured by Teijin DuPont Film Ltd. PET-SL) with thickness of 38 μm by a bar coater so as to form a strip with width of 5 mm. The thickness after two minutes drying at 100° C. was about 10 μm. Next, a sticky solution which was a mixture of 100 weight parts of acrylic adhesive (manufactured by Soken Chemical and Engineering Co., Ltd., SK Dyne 1473H) and 3.0 weight parts of a curing agent (Nippon Polyurethane Industry Co., Ltd., Coronate L-45) was coated by a bar coater so as to form a strip with width of 5 mm without superposing on the formerly applied adhesive. The thickness after 1 minute drying at 100° C. was about 10 μm.

EXAMPLE 2

For impact resistant polystyrene resin, a sheet-like resin was obtained by extruding the molten resin from a single-layer T-shape die of 1300 mm width using a single screw extruder (non-vent) with screw of 90 mm diameter and by cooling using the three-cooling-roller method. Two types of printing ink with different resin composition, comprising a polyvinylidene fluoride/acrylic (7/3) copolymer resin (0.0 nC of the amount of electrified charge against Teflon cylinder) and an acrylic resin (−1.8 nC of the amount of electrified charge against Teflon cylinder) ingredients, were coated on the surface of the said sheet using a photogravure coater so as to form stripes of regular intervals.

EXAMPLE 3

The coated sheet obtained in the example 2 was slit to 8 mm width, followed by punching guide holes and by compression molding to afford a carrier tape.

COMPARATIVE EXAMPLE 1

A sticky solution which was a mixture of 100 weight part of acrylic adhesive (manufactured by Soken Chemical and Engineering Co. Ltd., SK Dine 1473H) and 1.0 weight part of a curing agent (manufactured by Nippon Polyurethane Industry Co., Coronate L-45) was coated wholly on one side of polyester film (manufactured by Teijin DuPont Film Ltd. PET-SL) with thickness of 38 μm by a bar coater. The coated film was dried for two minutes at 100° C. The thickness of the adhesive layer was about 10 μm.

COMPARATIVE EXAMPLE 2

After 10 weight part of carbon black and 90 weight part of impact resistant polystyrene resin was measured respectively and mixed uniformly using a high speed mixer, the mixture was kneaded using a venting twin screw extruder with screw of 45 mm diameter and was pelletized by a strand cut method to afford a conductive resin based composite. A sheet of 300 μm thickness was obtained from the conductive resin based composite by using an extruder (L/D=26) with screw of 40 mm diameter.

Evaluation of the Antistatic Performance

For the adhesive tapes, the sheets and the molded materials obtained these examples and comparative examples, the antistatic performance was evaluated according to the followings.

EXAMPLE 1 AND COMPARATIVE EXAMPLE 1

To evaluate the antistatic performance of the adhesive tapes obtained in Example 1 and Comparative example 1, the amount of electrostatic charge (call "amount of peeling electrification" in the following) in exfoliating the adhesive tape from its objects was measured using the instrument shown in FIG. 1. The objects were a TAC (triacetyl cellulose) film, PET (polyethylene terephthalate) film and PE (polyethylene) film of 50 μm thickness.

In FIG. 1, the object 1 was placed on the metal plate 4 and fixed by the clamp 13 so that the object 1 could not move. The metal plate 4 was desired to have a larger area than that of the object in order to catch all electric lines of force generated by the peeling electrification in the side of object 1 contacted with the metal plate 4 to enhance the measurement accuracy. The metal plate 4 was connected by the conducting wire 5 to the measurement probe 7 in the coulomb meter 6 which was a device for measuring electric charge. The coulomb meter 6 was always connected to the earth by the conducting wire 8. The coulomb meter was a measuring instrument based on the principle that stored once electric charge in a capacitor and measured the stored electric charge. Commercially available coulomb meter could be used without modification.

The metal plate 4 was connected to the earth by the conducting wire 9 through the switch 10. In addition, the metallic antistatic plate 11 with an area similar to or larger than the area of the object 1 was prepared separately. Any metallic plates could be used as the antistatic plate 11. The antistatic plate 11 was desirable to have an area to fully contact with the largest one among the object and adhesive tape.

The metal plate 4 was fixed on the metallic measuring desk 15 through the insulator 14. Any materials that gave electrical insulation and were difficult to be charged, for example, ceramics and glass (particularly ceramics are preferable), might be used as the insulators 14.

The charge was generated on the object 1 by the peeling in exfoliating a sample 12 such as adhesive tape pasted on the object 1. Charges with opposite polarity was generated on the metal plate 4 contacted with the object 1 in exfoliating a sample 12 and charges with the same polarity as charges generated simultaneously on the object 1 was transferred to the measurement probe 7 in the coulomb meter 6 through the conducting wire 5 and was displayed as the then charge amount of peeling electrification on the coulomb meter 6.

The amount of peeling electrification generated on the whole object 1 might be measured because all charges generated on the whole object 1 was acquired by using the metal plate 4.

The profile of the amount of peeling electrification might be determined by plotting the charge for time axis since the charge was generated according to the peeling of the adhesive tape 12. The measuring device was desirable to be shielded by electroconductive materials connected with the earth (it is not illustrated in FIG. 1). Electroconductive materials were materials with electroconductivity. For example, metallic materials or metallic materials holed in the degree that does not affect the measurement might be used as electroconductive materials, but the electroconductive materials were not limited to these. Among the measuring instruments, the resin-containing products such as the coulomb meter 6, the measuring probe 7 and the switch 10 were desirable to be placed on the outside of the shields.

The amount of peeling electrification in exfoliating completely the adhesive tape was measured using the aforesaid instruments in the following conditions and the results were described in Table 1.

The object 1 was fixed by the clamp 13 to the metal plate 4 which had the same area (125 mm×50 mm) as the object 1 and was placed on the insulator (ceramics), and the adhesive tape of 125 mm×25 mm (the actually pasted part of 100 mm×25 mm) was pasted on the object 1 in a speed of 300 mm/min by a roller conformed to JISZ-0237. Moreover, the antistatic plate 11 was placed on the adhesive tape and the metal plate 4 was switched to the earth by the switch 10 simultaneously and left for 30 second. Then, the antistatic plate 11 was removed quickly and the metal plate 4 was disconnected from the earth by switching of the switch 10. The amount of peeling electrification was measured by exfoliating the adhesive tape at a speed of 500 mm/second using ceramic tweezers. The object pasted with the adhesive tape beforehand could be used also. The metal plate 14 was made of stainless steel described in JISG4305 and its thickness was 1.5 mm. Its surface was marked lightly by No. 280 waterproof abrasive paper described in JISR6253 in the axial direction of the test plate and was ground uniformly in length direction over the full length until the mark disappeared completely. The antistatic plate 11 was made of stainless steel described in JISG4305 and its thickness was 1.5 mm. Its surface was marked lightly by No. 280 waterproof abrasive paper described in JISR6253 in the axial direction of the test plate and was ground uniformly in length direction over the full length until the mark disappeared completely. NK-1001 of the Kasuga Electric Works Co., Ltd was used as a coulomb meter.

TABLE 1

|  | TAC film | PET film | PE film |
| --- | --- | --- | --- |
| Example 1 | −15.0 nC | −18.0 nC | −3.0 nC |
| Comparative example 1 | −31.7 nC | −22.0 nC | −17.7 nC |

As shown in Table 1, the measured amount of peeling electrification for the samples coated alternately two different adhesives in Example 1 showed smaller values than those of singly coated samples in Comparative example 1. This tendency is recognized on any objects. Thus, it was found that the amount of peeling electrification could be controlled and the antistatic performance was excellent.

EXAMPLE 2~3 AND COMPARATIVE EXAMPLE 2

An IC was placed on the sheets or the molded products according to the Example 2~3 and Comparative example 2 and was rubbed with a vibrator at a vibration speed of 600 times/minute for 30 seconds, and then, the IC picked up by ceramic tweezers was thrown into a Faraday cage and the charge generated on the rubbed surface of the IC is measured. For the measurement of the amount of electrificated charge, Nano coulomb meter and Faraday cage of Electro-Tech System Co. were used.

TABLE 2

|  | amount of electrificated charge |
| --- | --- |
| Example 2 | 0.20 nC |
| Example 3 | 0.14 nC |
| Comparative example 2 | −2.56 nC |

As shown in Table 2, the charge generated on the surface was reduced by mounting multiple resin based composites with different triboelectric series order on the surface and the members with excellent antistatic performance could be obtained.

INDUSTRIAL APPLICABILITY

By producing intentionally the structure of which two or more resin based compositions with different triboelectric series order are exposed to the most exterior surface of members at least on the one side, antistatic materials which control the static electricity generated by peeling, contact or friction may be obtained. The use of the obtained antistatic materials enables to reduce all electrostatic failures for any adhered materials, contents, or resin types and forms of friction materials.

The invention claimed is:

1. An antistatic method comprising mounting a layer consisting of cured silicone resin and a layer consisting of cured acrylic resin side-by-side along a surface of a member; and peeling the layer consisting of cured silicone resin and the layer consisting of cured acrylic resin from the surface of the member.

2. The antistatic method according to claim 1, wherein the layer consisting of cured silicone resin and the layer consisting of cured acrylic resin are, respectively, electrified more positively and more negatively than the member.

3. The antistatic method according to claim 1, wherein the layer consisting of cured silicone resin and the layer consisting of cured acrylic resin differ more than 0.1 nC in the amounts of electrified charge.

4. The antistatic method according to claim 1, wherein the member is a resin based sheet, resin based film or resin molded material.

5. The antistatic method according to claim 1, wherein each of the layer consisting of cured silicone resin and the layer consisting of cured acrylic resin is mounted on the surface of the member in a pattern selected from the group consisting of a stripe, a dot and a mesh.

* * * * *